(12) United States Patent
Uchida et al.

(10) Patent No.: US 8,192,711 B2
(45) Date of Patent: Jun. 5, 2012

(54) PROCESS FOR PRODUCTION OF CATHODE ACTIVE MATERIAL FOR LITHIUN ION SECONDARY BATTERY

(75) Inventors: Megumi Uchida, Chigasaki (JP); Takeshi Kawasato, Chigasaki (JP); Remi Hiraki, Chigasaki (JP)

(73) Assignee: AGC Seimi Chemical Co., Ltd., Chigasaki-shi (JP)

( * ) Notice: Subject to any disclaimer, the term of this patent is extended or adjusted under 35 U.S.C. 154(b) by 160 days.

(21) Appl. No.: 12/606,224

(22) Filed: Oct. 27, 2009

(65) Prior Publication Data

US 2011/0033749 A1 Feb. 10, 2011

Related U.S. Application Data

(63) Continuation of application No. PCT/JP2008/069814, filed on Oct. 30, 2008.

(30) Foreign Application Priority Data

Nov. 1, 2007 (JP) ................................. 2007-285507

(51) Int. Cl.
*C01G 51/00* (2006.01)
(52) U.S. Cl. .................. 423/274; 429/231.95; 427/212; 427/213.31; 427/215; 427/217; 427/126.3; 428/403; 428/404
(58) Field of Classification Search .................. 427/212, 427/213.31, 215, 217, 126.3; 502/324, 227, 502/328, 330; 428/403, 404; 423/274; 429/231.95
See application file for complete search history.

(56) References Cited

U.S. PATENT DOCUMENTS

| | | | |
|---|---|---|---|
| 6,139,815 A * | 10/2000 | Atsumi et al. | ................ 423/598 |
| 7,481,991 B2 | 1/2009 | Kawasato et al. | |
| 2004/0229123 A1 * | 11/2004 | Takahashi et al. | ......... 429/231.1 |
| 2006/0154146 A1 | 7/2006 | Kawasato et al. | |
| 2007/0026314 A1 | 2/2007 | Kawasato et al. | |
| 2007/0264573 A1 * | 11/2007 | Yamada et al. | ............ 429/231.1 |
| 2008/0131780 A1 | 6/2008 | Kawasato et al. | |
| 2008/0135802 A1 * | 6/2008 | Saito et al. | ................. 252/182.1 |
| 2010/0173199 A1 * | 7/2010 | Hiraki et al. | .................. 429/223 |

FOREIGN PATENT DOCUMENTS

| | | |
|---|---|---|
| JP | 2002-151078 | 5/2002 |
| JP | 2004-103566 | 4/2004 |
| JP | 2004-319105 | 11/2004 |
| JP | 2005-50712 | 2/2005 |
| JP | 2005-123111 | 5/2005 |
| JP | 2006-202702 | 8/2006 |
| JP | 2006-318797 | 11/2006 |
| JP | 2007-145695 | 6/2007 |
| KR | 10-2004-0084643 | 10/2004 |
| WO | 99-03784 | 1/1999 |
| WO | WO 2007/037235 | 4/2007 |

OTHER PUBLICATIONS

Japan 2002-151078, translation, May 2002.*
U.S. Appl. No. 13/196,950, filed Aug. 3, 2011, Hiraki, et al.
Korean Office Action issued Mar. 21, 2011, in Patent Application No. 10-2009-7012633 (with English-language translation).
U.S. Appl. No. 12/683,458, filed Jan. 7, 2010, Hiraki, et al.

* cited by examiner

*Primary Examiner* — Steven Bos
(74) *Attorney, Agent, or Firm* — Oblon, Spivak, McClelland, Maier & Neustadt, L.L.P.

(57) ABSTRACT

To provide a process for producing a surface modified lithium-containing composite oxide, which is excellent in discharge capacity, volume capacity density, safety, durability for charge and discharge cycles and an excellent rate property, at a low production cost.

The present invention is characterized in that a process for producing a surface modified lithium-containing composite oxide, wherein a lithium titanium composite oxide is contained in the surface layer of particles of a lithium-containing composite oxide represented by the formula: $Li_pN_xM_yO_zF_a$, where N is at least one element selected from the group consisting of Co, Mn and Ni, M is at least one element selected from the group consisting of Al, Sn, alkaline earth metal elements and transition metal elements other than Co, Mn and Ni, $0.9 \leq p \leq 1.3$, $0.9 \leq x \leq 2.0$, $0 \leq y \leq 0.1$, $1.9 \leq z \leq 4.2$, and $0 \leq a \leq 0.05$, which comprises impregnating a solution having a lithium source and a titanium source dissolved therein, followed by heat treatment at a determined temperature, to obtain the surface modified lithium-containing composite oxide, wherein the titanium contained in the surface layer is from 0.01 to 1.95 mol %.

10 Claims, 2 Drawing Sheets

US 8,192,711 B2

PROCESS FOR PRODUCTION OF CATHODE ACTIVE MATERIAL FOR LITHIUN ION SECONDARY BATTERY

TECHNICAL FIELD

The present invention relates to a process for producing a lithium-containing composite oxide for a cathode active material for a lithium secondary battery, which has a large volume capacity density, high safety, and excellent durability for charge and discharge cycles, a positive electrode for a lithium secondary battery containing the produced lithium-containing composite oxide, and a lithium secondary battery.

BACKGROUND ART

Recently, as the portability and cordless tendency of instruments have progressed, a demand for a non-aqueous electrolyte secondary battery such as a lithium secondary battery which is small in size and light in weight and has a high energy density, has been increasingly high. As a cathode active material for the non-aqueous electrolyte secondary battery, a composite oxide of lithium and a transition metal or the like (which may be referred to as a "lithium-containing composite oxide") such as $LiCoO_2$, $LiNi_{1/3}CO_{1/3}Mn_{1/3}O_2$, $LiNiO_2$, $LiNi_{0.8}CO_{0.2}O_2$, $LiMn_2O_4$ or $LiMnO_2$, has been known.

Among others, a lithium secondary battery using $LiCoO_2$ as a cathode active material and using a lithium alloy or carbon such as graphite or carbon fiber as a negative electrode, can obtain a high voltage at a level of 4 V, whereby it has been widely used as a battery having a high energy density.

However, in the case of the non-aqueous type secondary battery using $LiCoO_2$ as a cathode active material, further improvement has been desired e.g. in the discharge capacity, in the stability against heat during heating (which may be referred to as a "safety" in the present invention) and in the capacity density per unit volume of the positive electrode layer (which may be referred to as a "volume capacity density" in the present invention), and it had a problem of e.g. deterioration in the durability for charge and discharge cycles such that the discharge capacity of the battery gradually decreases by repetitive charge and discharge cycles.

In order to solve these problems, various studies have been made heretofore. For example, it has been proposed to prepare a surface modified lithium composite oxide, by dispersing a mixture obtained by mixing a preliminarily synthesized lithium-containing composite oxide, titanium hydroxide and lithium hydroxide, into ethanol, and further wet-mixing it in a ball mill, followed by heat treatment, so that a lithium titanium composite oxide be present at the surface of particles (cf. Patent Document 1). Further, it has been proposed to prepare a surface modified lithium composite oxide, by subjecting a preliminarily synthesized lithium-containing composite oxide and a preliminarily synthesized lithium titanium composite oxide to particle composite treatment by using a mechanofusion device, or to coating treatment by using a high speed mixing flowage machine, so that a lithium titanium composite oxide be present at the surface of the particles (cf. Patent Documents 2 and 3).

Further, it has been proposed to prepare a surface modified lithium composite oxide, by adding a lithium source to a coprecipitated product having titanium sulfate and cobalt sulfate coprecipitated, followed by firing, so that a titanium compound be present at the surface of particles (cf. Patent Document 4). Furthermore, it has been proposed to prepare a surface modified lithium composite oxide, by adding lithium hydroxide and titanium tetrachloride to a liquid having a preliminarily synthesized lithium-containing composite oxide dispersed, followed by heat treatment, so that a lithium titanium composite oxide be present at the surface of particles (cf. Patent Document 5).

Patent Document 1: JP-A-2006-202702
Patent Document 2: JP-A-2004-319105
Patent Document 3: JP-A-2004-103556
Patent Document 4: JP-A-2005-123111
Patent Document 5: JP-A-2002-151078

DISCLOSURE OF THE INVENTION

Object to be Accomplished by the Invention

As described above, various studies have been made heretofore. However, a lithium-containing composite oxide satisfying all of various characteristics such as a discharge capacity, safety, volume capacity density, and durability for charge and discharge cycles has not yet been obtained.

For example, in Patent Document 1, a lithium titanium composite oxide and a lithium-containing composite oxide are wet-mixed in a ball mill to obtain a surface modified lithium composite oxide having the lithium titanium composite oxide in the surface of particles. However, since the particles of the lithium titanium composite oxide and the particles of the lithium-containing composite oxide are permitted to collide with each other, the surface of particles of the lithium-containing composite oxide cannot be uniformly coated with the lithium titanium composite oxide. That is, a part where a lot of lithium titanium composite oxide exists and a part where little lithium titanium composite oxide exists are created at the surface of particles, and further, a thick part and a thin part are created in the layer of the lithium titanium composite oxide existing at the surface of particles, i.e. only ununiform coating is attainable. Moreover, during the ball mill treatment, an impurity from the ball is mixed. Further, during the ball mill treatment, the average particle size of the lithium-containing composite oxide becomes small and the specific surface area becomes large, whereby a lithium-containing composite oxide having a desired particle size and specific surface area is not obtained. For these reasons, the surface modified lithium-containing composite oxide described in Patent Document 1 was insufficient in the improvement of battery characteristics such as the discharge capacity, capacity density and charge and discharge cycle durability, and it was not possible to obtain a surface modified lithium-containing composite having desired characteristics. Further, Patent Document 1 does not describe or suggest the technical idea of impregnating a solution containing a titanium source and a lithium source to the lithium-containing composite oxide.

Further, in Patent Document 2, a preliminarily synthesized lithium-containing composite oxide and a preliminarily synthesized lithium titanium composite oxide are subjected to particle composite treatment by using a mechanofusion device to obtain a surface modified lithium-containing composite oxide. In Patent Document 3, a preliminarily synthesized lithium-containing composite oxide and a preliminarily synthesized lithium titanium composite oxide are subjected to coating treatment by using a high speed mixing flowage machine to obtain a surface modified lithium-containing composite oxide. However, in both methods, the particles of the lithium titanium composite oxide and the particles of the lithium-containing composite oxide are permitted to collide with each other, whereby the surface of particles of the lithium-containing composite oxide cannot be uniformly coated with the lithium titanium composite oxide, like in the method described in Patent Document 1. Further, the average particle size of the lithium-containing composite oxide becomes small and the specific surface area becomes large, whereby a lithium-containing composite oxide having a desired particle size and specific surface area is not obtained. Therefore, surface modified lithium-containing composite oxides described in Patent Documents 2 and 3 are insufficient in the improvement of battery characteristics such as the discharge capacity, capacity density and durability for charge and discharge cycles, whereby it was not possible to obtain a surface modified lithium-containing composite oxide having desired characteristics.

Further, in Patent Document 4, a mixture obtained by mixing a coprecipitated product containing cobalt and titanium with a lithium source is fired to obtain a surface modified lithium-containing composite oxide. Further, a coprecipitated product containing cobalt and nickel is mixed with an aluminum source, a titanium source and a lithium source, followed by firing to obtain a surface modified lithium-containing composite oxide. In an Example, a lithium source was added to a coprecipitated product having titanium sulfate and cobalt sulfate coprecipitated, followed by firing to obtain a surface modified lithium-containing composite oxide. However, the surface modified lithium-containing composite oxide obtained by such a synthesis method has a lithium titanium composite oxide not only at the surface of particles but also inside of particles, whereby the amount of the lithium-containing composite oxide inside of the particles decreases and the amount of the cathode active material contributing to charge and discharge decreases, and the battery characteristics such as the discharge capacity, and charge and discharge cycle durability deteriorate, such being undesirable.

Further, in Patent Document 5, lithium hydroxide and titanium tetrachloride are added to a liquid having a preliminarily synthesized lithium-containing composite oxide dispersed, followed by heat treatment to obtain a surface modified lithium-containing composite oxide. However, when titanium tetrachloride is used as a titanium source, colloids of the titanium hydroxide are formed and adsorbed on the surface of particles of the lithium-containing composite oxide. In such surface modification using colloidal particles, the surface of particles can not be coated uniformly, and chlorine derived from titanium tetrachloride remains as an impurity. Therefore, the battery characteristics such as the discharge capacity, capacity density, and durability for charge and discharge cycles are insufficient, whereby it was not possible to obtain a surface modified lithium-containing composite oxide having desired characteristics.

As described above, various studies have been made heretofore. However, a lithium-containing composite oxide satisfying all of various characteristics such as a discharge capacity, safety, volume capacity density, and durability for charge and discharge cycles has not yet been obtained.

The present invention is to provide a process for producing a surface modified lithium-containing composite oxide, which has large discharge capacity and volume capacity density, high safety, excellent durability for charge and discharge cycles and an excellent rate property, at a low production cost, a positive electrode for a lithium secondary battery containing the produced lithium-containing composite oxide, and a lithium secondary battery.

Means to Accomplish the Object

The present inventors of the present invention have conducted extensive studies and found a process for producing a surface modified lithium-containing composite oxide, which accomplishes the above-mentioned object excellently. The present invention provides the following.

(1) A process for producing a surface modified lithium-containing composite oxide for a cathode active material for a lithium ion secondary battery, wherein a lithium titanium composite oxide is contained in the surface layer of particles of a lithium-containing composite oxide represented by the formula: $Li_pN_xM_yO_zF_a$, where N is at least one element selected from the group consisting of Co, Mn and Ni, M is at least one element selected from the group consisting of Al, Sn, alkaline earth metal elements and transition metal elements other than Co, Mn and Ni, $0.9 \leq p \leq 1.3$, $0.9 \leq x \leq 2.0$, $0 \leq y \leq 0.1$, $1.9 \leq z \leq 4.2$, and $0 \leq a \leq 0.05$, which comprises impregnating a solution having a lithium source and a titanium source dissolved therein to a powder of the lithium-containing composite oxide, and subjecting the obtained lithium titanium-impregnated particles to heat treatment at from 400 to 1,000° C., to obtain the surface modified lithium-containing composite oxide, wherein the titanium contained in the surface layer is from 0.01 to 1.95 mol % to the lithium-containing composite oxide as a base material.

(2) The process according to the above (1), wherein the lithium titanium composite oxide is at least one member selected from the group consisting of $Li_2Ti_3O_7$, $Li(Li_{1/3}Ti_{5/3})O_4$, $LiTiO_2$, $Li_2(Li_{1/3}Ti_{5/3})O_4$ and $Li_2TiO_3$.

(3) The process according to the above (1) or (2), wherein the ratio of lithium to titanium (Li/Ti) contained in the lithium titanium composite oxide is from 1/100 to 5/1 by atomic ratio.

(4) The process according to any one of the above (1) to (3), wherein the solution having the lithium source and the titanium source dissolved therein contains a carboxylic acid having at least 2 carboxyl groups, or at least 2 in total of carboxyl groups and hydroxyl groups or carbonyl groups.

(5) The process according to any one of the above (1) to (4), wherein the solution having the lithium source and the titanium source dissolved therein has a pH of from 1 to 7.

(6) The process according to any one of the above (1) to (5), wherein the titanium source is titanium lactate.

(7) The process according to any one of the above (1) to (6), wherein the solution having the lithium source and the titanium source dissolved therein is an aqueous solution.

(8) The process according to any one of the above (1) to (7), wherein element M contains at least one element selected from the group consisting of Al, Ti, Zr, Hf, Nb, Ta, Mg, Sn and Zn.

(9) The process according to any one of the above (1) to (8), wherein the lithium source is lithium carbonate.

(10) The process according to any one of the above (1) to (9), wherein element N is Co.

(11) A positive electrode for a lithium secondary battery, which comprises a cathode active material, an electroconductive material and a binder, wherein the cathode active material is the surface modified lithium-containing composite oxide obtained by the process as defined in any one of the above (1) to (10).

(12) A lithium ion secondary battery, which comprises a positive electrode, a negative electrode, an electrolytic solution and an electrolyte, wherein the positive electrode is the one as defined in the above (11).

Effects of Invention

According to the present invention, it is possible to provide a process for producing a surface modified lithium-containing composite oxide useful as a positive electrode for a lithium secondary battery, which has large discharge capacity and volume capacity density, high safety, excellent durability for charge and discharge cycles and an excellent rate property, at a low production cost, a positive electrode for a lithium secondary battery containing the produced lithium-containing composite oxide, and a lithium secondary battery.

The reason why the surface modified lithium-containing composite oxide obtained by the present invention demonstrated the above-mentioned excellent properties as the positive electrode for a lithium secondary battery, is not necessarily clear, but it virtually considered to be as follows.

Generally, in a charged state, a lithium-containing composite oxide used as a positive electrode of a battery is in such a state that lithium ions are withdrawn and the structure becomes unstable. When the temperature increases in such a state, a decomposition reaction of the lithium-containing composite oxide progresses and substantial heat generation occurs. In the present invention, a solution having a lithium source and a titanium source dissolved therein is impregnated to preliminarily synthesized particles of the lithium-containing composite oxide (which may be referred to as a "base material" in the present invention), followed by heat treatment at a specific temperature, whereby the finally obtained powder of the surface modified lithium-containing composite oxide can bring a composite oxide containing lithium and titanium in the surface layer of the particles (which may be referred to as a "lithium titanium composite oxide" in the present invention) to be present extremely uniformly. The surface of the particles of the lithium-containing composite oxide is coated with the lithium titanium composite oxide, whereby it is possible to decrease the contact area between the lithium-containing composite oxide and an electrolytic solution. As a result, it is considered possible to provide a cathode active material having safety improved and being capable of providing characteristics excellent in durability for charge and discharge cycles.

Further, the lithium titanium composite oxide has high lithium ion conductivity, whereby by coating the surface of particles with a lithium titanium composite oxide which has little structural change caused by movement of lithium ions, it is possible to reduce a structural change caused by in/out of lithium ions of the lithium-containing composite oxide inside. Therefore, it is considered possible to further improve characteristics such as the rate property without decreasing the discharge capacity.

It is one of characteristics of the coating solution used in the present invention that it contains at least a lithium source and a titanium source. Therefore, it is possible to easily control the composition of the lithium titanium composite oxide.

BEST MODE FOR CARRYING OUT THE INVENTION

Figure 1:
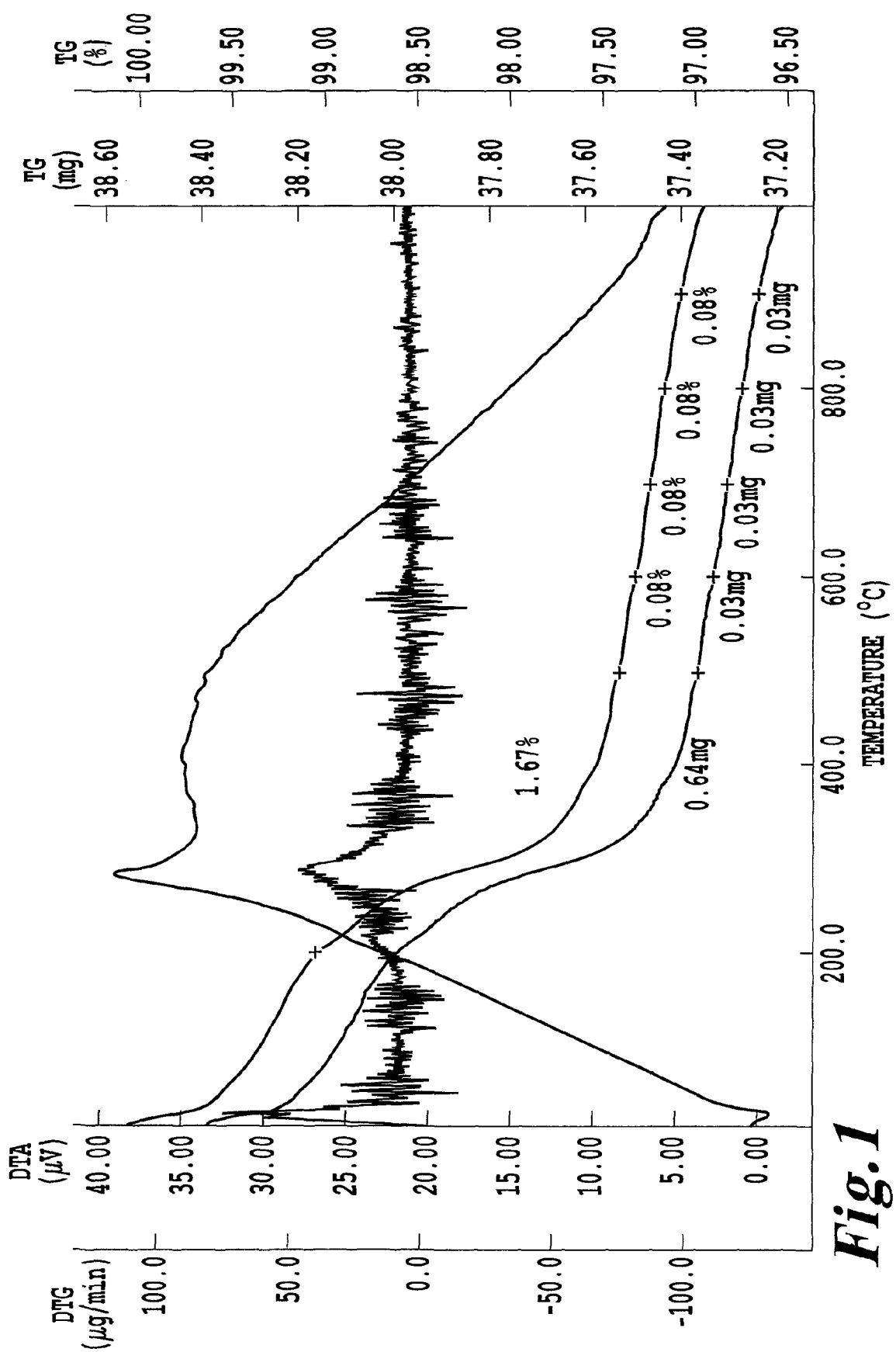
FIG. 1: TG-DTA chart of lithium titanium-impregnated particles, obtained in Example 1.

In the present invention, a solution having at least a lithium source and a titanium source dissolved therein (which may be referred to as a "coating solution" in the present invention) is impregnated to a powder of a preliminarily produced lithium-containing composite oxide, and the obtained lithium titanium-impregnated particles are subjected to heat treatment to obtain a surface modified lithium-containing composite oxide. The coating solution is preferably an aqueous solution.

The aqueous solution may preferably contain e.g. an alcohol, ethylene glycol or glycerin in addition to water, as a solvent which contains water as the main component. With respect to the specific proportion of water to the total of water and solvents other than water, water occupies preferably at least 80 vol %, more preferably at least 90 vol %, further preferably at least 95 vol %. Further, as the upper limit, preferred is only water, that is, 100 vol % of water from the viewpoint of a load to environment.

The lithium-containing composite oxide used as a base material in the present invention is obtained by a known method and is represented by the formula: $Li_pN_xM_yO_zF_a$. In the formula, p, x, y, z and a are as defined above. Among them, p, x, y, z and a are respectively preferably as follows. $0.95 \leq p \leq 1.3$, $0.9 \leq x \leq 1.0$, $0 \leq y \leq 0.1$, $1.9 \leq z \leq 2.1$, and $0 \leq a \leq 0.05$. Here, when a is larger than 0, the formula represents a composite oxide wherein some of oxygen atoms are substituted by fluorine atoms. In such a case, the safety of the obtained cathode active material is improved. p, x, y, z and a are respectively particularly preferably as follows. $0.97 \leq p \leq 1.10$, $0.97 \leq x \leq 1.00$, $0.0005 \leq y \leq 0.05$, $1.95 \leq z \leq 2.05$, and $0.001 \leq a \leq 0.01$.

In the above formula, element N is at least one element selected from the group consisting of Co, Mn and Ni. Particularly, element N is preferably Co, Ni, Co and Ni, Mn and Ni, or Co, Ni and Mn, more preferably Co, or a combination of Co, Ni and Mn, particularly preferably Co.

In the present invention, when element N is Co, the molar ratio of Li/(N+M), which is a value obtained by dividing the amount of lithium in the lithium-containing composite oxide by the total amount of element N and element M, is particularly preferably from 0.97 to 1.10. It is more preferably from 0.99 to 1.05, and in such a case, the grain growth of the lithium-containing composite oxide is promoted, whereby particles having a higher density can be obtained.

In the present invention, element M is at least one element selected from the group consisting of Al, Sn, alkaline earth metal elements and transition metal elements other than Co, Mn and Ni. Here, the above transition metal elements represent transition metals of Group 4, Group 5, Group 6, Group 7, Group 8, Group 9, Group 10, Group 11 or Group 12 in the Periodic Table. Particularly, element M is preferably at least one element selected from the group consisting of Al, Ti, Zr, Hf, Nb, Ta, Mg, Sn and Zn. From the viewpoint of a capacity developing property, safety or cycle durability, element M is more preferably at least one element selected from the group consisting of Al, Ti, Zr, Nb, and Mg.

When element M contains Al and Mg, the atomic ratio of Al to Mg is preferably from 1/4 to 4/1, particularly preferably from 1/3 to 3/1, and further when y is preferably $0.005 \leq y \leq 0.05$, particularly preferably $0.01 \leq y \leq 0.035$, the balance of battery performance, i.e. the balance of the initial weight capacity density, safety, and durability for charge and discharge cycles, is good, such being preferred.

When element M contains Zr and Mg, the atomic ratio of Zr to Mg is preferably from 1/40 to 2/1, particularly preferably from 1/30 to 1/5, and further, when y is preferably $0.005 \leq y \leq 0.05$, particularly preferably $0.01 \leq y \leq 0.035$, the balance of battery performance, i.e. the balance of the initial weight capacity density, initial volume capacity density, safety, and durability for charge and discharge cycles, is good, such being preferred.

In the present invention, it is preferred that the coating solution contains a carboxylic acid. Particularly, it is preferred that the carboxylic acid has at least 2 carboxyl groups, or at least 2 in total of carboxyl groups and hydroxyl groups or carbonyl groups. Such a carboxylic acid is preferably used, such it can improve the solubility of the lithium source and the titanium source and raise the concentration of lithium ions and titanium ions dissolved in the aqueous solution. Particularly preferred is a case where it has a molecular structure wherein from 2 to 4 carboxyl groups exist and further from 1 to 4 hydroxyl groups coexist, since the solubility can thereby be made high. The carboxylic acid is particularly preferably an aliphatic carboxylic acid having from 2 to 8 carbon atoms. When the number of carbon atoms is from 2 to 8, the solubility of the lithium source and the titanium source is improved, such being preferred and the number of carbon atoms is particularly preferably from 2 to 6. Here, for the coating solution, it is possible to use e.g. water or an alcohol such as ethanol or methanol. From the viewpoint of the influence over environment and the cost, it is preferred to use water.

The aliphatic carboxylic acid having from 2 to 8 carbon atoms is preferably citric acid, tartaric acid, oxalic acid, malonic acid, maleic acid, malic acid, racemic acid, lactic acid or glyoxylic acid, particularly preferably citric acid, maleic acid, lactic acid or tartaric acid, since it is possible to raise the solubility and the cost is relatively low. When a carboxylic acid with a high acidity is used, a certain element of the element N source is likely to be dissolved when the pH of the coating solution is lower than 1. In such a case, it is preferred to adjust the pH in a range of from 1 to 7 by addition of a base such as ammonia. By controlling the pH within such a range, a coating solution having lithium ions and titanium ions dissolved therein with high concentration can be obtained, whereby it is possible to easily remove e.g. an aqueous medium in a subsequent step of mixing or heat treatment. When the coating solution is acidic, it becomes stable. Therefore, the pH is more preferably from 3 to 5.

Further, it is possible to adjust the pH of the coating solution by adding a pH adjuster and/or an aqueous alkaline solution to the coating solution. The pH adjuster to be used may be ammonia, ammonium bicarbonate or the like. The aqueous alkaline solution to be used may be a solution of e.g. a hydroxide such as sodium hydroxide, potassium hydroxide or lithium hydroxide.

It is necessary that the lithium source and the titanium source are dissolved as uniformly as possible in the coating solution to be used in the present invention. A suspension or colloidal solution is not included in the coating solution of the present invention, because the effect of the present invention cannot be sufficiently achieved with the use of the suspension or colloidal solution. That is, in the coating solution of the present invention, it is necessary that the lithium source and the titanium source are dissolved therein so as not to be visually identified as solid components or colloids.

The lithium source and the titanium source to be used for adjusting the coating solution are preferably the ones dissolved uniformly in the solution. For example, preferred is an inorganic salt such as an oxide, a hydroxide, a carbonate or a nitrate, an organic salt such as an acetate, an oxalate, a citrate or a lactate, an organic metal chelate complex, a compound wherein a metal alkoxide is stabilized by e.g chelate, or a mixture thereof Among them, more preferred is the oxide, the hydroxide, the carbonate, the nitrate, the acetate, the oxalate, the citrate, the lactate or a mixture thereof Further, when the citrate is used, the pH of the coating solution tends to be low, and elution of element N to the coating solution from the lithium-containing composite oxide as a base may happen. Therefore, it is preferred to adjust the pH in a range of from 1 to 7 by addition of the above pH adjuster or aqueous alkaline solution.

The coating solution to be used in the present invention can be adjusted with heating, if necessary. Preferred is to heat at from 40° C. to 80° C., particularly preferably at from 50° C. to 70° C. The heating makes the dissolution of the lithium source and the titanium source proceed easily, whereby the lithium source and the titanium can be stably dissolved in a short period of time.

In the present invention, the higher the total concentration of the lithium source and the titanium source contained in the coating solution to be used in the present invention, the better, since it is desired that the aqueous medium is in a small amount in the subsequent step of heat treatment. However, if the concentration is too high, the viscosity will become high to deteriorate the mixing property with the lithium source and the titanium source, and whereby it will be difficult to coat the surface of particles of the lithium-containing composite oxide uniformly with the lithium titanium composite oxide. Therefore, the total concentration of the lithium source and the titanium source contained in the coating solution is preferably from 0.01 to 30% by weight, more preferably from 0.1 to 15% by weight.

The above coating solution may contain an alcohol such as methanol or ethanol, or a polyol having an effect to let a complex form. Examples of the polyol include ethylene glycol, propylene glycol, diethylene glycol, dipropylene glycol, polyethylene glycol and butane diol glycerin. When these compounds are contained, the content in the coating solution is preferably from 1 to 20% by weight.

Further, as the titanium source in the coating solution of the present invention, titanium lactate is preferred. Titanium lactate has carboxyl groups and hydroxyl groups in the molecule, whereby the chelate effect stabilizes lithium ions and titanium ions contained in the coating solution.

Further, as the lithium source in the coating solution of the present invention, it is preferred to use lithium carbonate or lithium hydroxide, and more preferred is lithium carbonate available at a lower cost among them. The lithium source having an average particle size (D50) of from 2 to 25 μm is easily dissolved, such being preferred.

The method of impregnating the coating solution to the lithium-containing composite oxide is not limited, but may be a means for impregnation by spraying the coating solution to the powder of the lithium-containing composite oxide, or a means for impregnation by mixing and stirring the coating solution and the lithium-containing composite oxide in a container. Specific examples of the spraying means include a spray drier, a flash drier, a belt drier and a thermoprocessor. The means of mixing and stirring in a container to be used may, for example, be a twin screw kneader, an axial mixer, a paddle mixer, a turbulizer, a Redige mixer or a drum mixer. In this case, a solid content concentration in the slurry is preferably as high as possible as long as the mixture is uniformly mixed, and a solid/liquid ratio (based on weight) is preferably from 30/70 to 99.5/0.5, more preferably from 85/15 to 99/1, particularly preferably from 90/10 to 97/3. Further, it is preferred to perform reduced pressure treatment while carrying out impregnation, since it is thereby possible to simultaneously dry the lithium titanium-impregnated particles in a short time.

After impregnating the coating solution to the powder of the lithium-containing composite oxide of the present invention, the obtained impregnated particles can be dried. In this case, the impregnated particles are dried preferably at from 15 to 200° C., particularly preferably at from 50 to 120° C., usually, for from 0.1 to 10 hours. Since the an aqueous medium in the impregnated particles will be removed in a subsequent step of heat treatment, it is not necessary to remove it completely at this stage. However, it is preferred to remove it as much as possible at this stage, since a lot of energy will be required to volatilize moisture in a subsequent step of heat treatment.

Further, the temperature during heat treatment of the lithium titanium-impregnated particles of the present invention is from 400 to 1,000° C., preferably from 500 to 900° C., more preferably from 600 to 800° C. When the heat treatment is carried out within such a temperature range, it is possible to obtain a surface modified lithium-containing composite oxide having further improved battery characteristics such as the discharge capacity, durability for charge and discharge cycles and safety. It is also possible to confirm that such a range is preferred from the heating values to the respective temperatures of TG-DTA chart in FIG. 1. Further, the heat treatment is preferably carried out in an oxygen-containing atmosphere, specifically, more preferably in an atmosphere at an oxygen concentration of from 10 to 40 vol %.

In the present invention, the lithium titanium composite oxide preferably exists so as to cover the surface layer of particles at a higher concentration than the inside of the particles of the finally obtained surface modified lithium-containing composite oxide. It is considered that by the lithium titanium composite oxide being present at the surface of the particles, the contact area with an electrolytic solution can be decreased, and the safety, and durability for charge and discharge cycles are improved. In the present invention, the surface layer of particles of the lithium-containing composite oxide means a part from the surface of the primary particles to 100 nm from the surface of the particles.

Further, the surface layer represents the surface of the primary particles. It is considered that the surface of the primary particles is uniformly coated in the present invention, since the coating solution penetrates to the gap among the primary particles, as compared with a case where a conventional solid phase reaction or solution having particles dispersed is used. Therefore, the characteristics of a battery which uses the obtained surface modified lithium titanium composite oxide are improved. Further, when the particles of the lithium-containing composite oxide form secondary agglomerated particles, the surface of the primary particles is uniformly coated.

Further, since the lithium titanium composite oxide contained in the surface layer of the surface modified lithium-containing composite oxide of the present invention has lithium ion conductivity, further improvement of a rate property and a decrease in impedance are achieved without decreasing the discharge capacity by polarization, as compared with a case where the surface is simply coated with oxide of titanium such as titanium oxide having no lithium ion conductivity. Specific examples of the lithium titanium composite oxide may be preferably $Li_2Ti_3O_7$, $Li(Li_{1/3}Ti_{5/3})O_4$, $LiTiO_2$, $Li_2(Li_{1/3}Ti_{5/3})O_4$ and $Li_2TiO_3$. Among them, $LiTiO_2$ or $Li_2(Li_{1/3}Ti_{5/3})O_4$ containing trivalent titanium atoms and having high electron conductivity is more preferred.

When the surface of the particles of the lithium-containing composite oxide is coated with a compound having lithium ion conductivity, the rate property, durability for charge and discharge cycles, safety, and the like can be improved. Further, when the surface of particles is coated with a compound having high electron conductivity, the rate property, charge and discharge efficiency, and the like can be further improved.

In the present invention, the lithium titanium composite oxide present at the surface layer of the particles of the surface modified lithium-containing composite oxide is a compound containing at least lithium and titanium, and may be a mixture containing several kinds of lithium titanium composite oxides.

The amount of titanium contained in the surface layer of the particles of the surface modified lithium-containing composite oxide obtained in the present invention to the lithium-containing composite oxide as a base material is preferably from 0.01 to 1.95 mol %, more preferably from 0.05 to 1.00 mol %, further more preferably from 0.1 to 0.5 mol %. Here, the amount of titanium contained in the surface layer of the particles of the present invention means the amount of titanium contained in the surface layer obtained by calculation from the amount of the titanium source used for preparation of the coating solution and the amount of the lithium-containing composite oxide used for the base material. Specifically, when b (g) of the base material of the formula weight w obtained by the composition analysis of the base material is subjected to coating treatment with d (g) of the coating solution having a titanium content of c (% by weight), with an atomic weight of titanium of 47.88, the amount (mol %) of titanium contained in the surface layer is obtained by the following formula.

The amount of titanium contained in the surface layer=(c×d×w)/(47.88×b)

Further, in a case where titanium is contained in the lithium-containing composite oxide as a base material, the amount (mol %) of titanium contained in the surface layer is a value obtained by the same manner as in the above.

Further, the ratio of lithium to titanium (Li/Ti) contained in the lithium titanium composite oxide is preferably from 1/100 to 5/1, more preferably from 1/10 to 3/1, particularly preferably from 1/3 to 3/2 by atomic ratio. In this case, by using a positive electrode containing the obtained surface modified lithium-containing composite oxide, it is possible to reduce a decrease in the discharge capacity and to improve the charge and discharge efficiency, durability for charge and discharge cycles, rate property, and safety.

With respect to the surface modified lithium-containing composite oxide thus produced, the average particle size D50 is preferably from 5 to 30 μm, particularly preferably from 8 to 25 μm; the specific surface area is preferably from 0.1 to 0.7 $m^2/g$, particularly preferably from 0.15 to 0.5 $m^2/g$; the half value width of the diffraction peak of (110) plane at 2θ=66.5±1° as measured by means of an X-ray diffraction analysis in which CuKα rays are used as a radiation source, is preferably from 0.08 to 0.14°, particularly preferably from 0.08 to 0.12°.

Here, the average particle size D50 in the present invention means a volume-based accumulative 50% size (D50) which is a particle size at a point of 50% on an accumulative curve when the accumulative curve is drawn so that a particle size distribution is obtained on the volume basis and the whole volume is 100%. The particle size distribution is obtained from a frequency distribution and accumulative volume distribution curve measured by means of a laser scattering particle size distribution measuring apparatus. The measurement of particle sizes is carried out by measuring the particle size distribution while the powder is sufficiently dispersed in an aqueous medium by an ultrasonic treatment or the like (for example, using Microtrack HRAX-100 manufactured by NIKKISO CO., LTD.). Furthermore, D10 means a volume-based accumulative 10% size, and D90 means a volume-based accumulative 90% size.

Further, with respect to the surface modified lithium-containing composite oxide obtained in the present invention, the average particle size D50 means a volume-averaged particle size of secondary particles which are formed by mutual agglomeration and sintering of primary particles, and in a case where the particles are composed of the primary particles only, it means a volume-averaged particle size of the primary particles.

Further, when element N is cobalt, the press density of the surface modified lithium-containing composite oxide obtained by the present invention is preferably from 2.7 to 3.4 g/cm$^3$, particularly preferably from 2.8 to 3.3 g/cm$^3$. In the present invention, the press density means an apparent density of the powder of the surface modified lithium/titanium composite oxide when the powder is pressed under a pressure of 0.3 ton/cm$^2$. Further, in the surface modified lithium-containing composite oxide of the present invention, the amount of the remaining alkali is preferably at most 0.035% by weight, more preferably at most 0.020% by weight.

In a case where a positive electrode for a lithium secondary battery is to be produced from such a surface modified lithium-containing composite oxide, the powder of the composite oxide is mixed with a carbon type electroconductive material such as acetylene black, graphite or Ketjenblack and a binder material. As the above binder material, polyvinylidene fluoride, polytetrafluoroethylene, polyamide, carboxymethyl cellulose or an acrylic resin may, for example, be preferably employed. The powder of the surface modified lithium-containing composite oxide of the present invention, the electroconductive material and the binder material will be formed into a slurry or a kneaded product by using a solvent or a dispersion medium. The resultant is supported on a positive electrode current collector such as an aluminum foil or a stainless steel foil by e.g. coating to form a positive electrode for a lithium secondary battery.

In the lithium secondary battery using the surface modified lithium-containing composite oxide of the present invention as the cathode active material, a film of a porous polyethylene or a porous polypropylene may, for example, be used as a separator. Furthermore, as the solvent for the electrolytic solution of a battery, various solvents may be used, and a carbonate ester is preferred. As the carbonate ester, each of a cyclic type and a chain type can be used. As the cyclic carbonate ester, propylene carbonate or ethylene carbonate (EC) may, for example, be mentioned. As the chain carbonate ester, dimethyl carbonate, diethyl carbonate (DEC), ethyl methyl carbonate (EMC), methyl propyl carbonate or methyl isopropyl carbonate may, for example, be mentioned.

In the present invention, the above carbonate ester may be used alone or two or more of them may be used as mixed. Moreover, it may be used as mixed with another solvent. Furthermore, depending upon the material of the anode active material, there may be a case where the discharge property, cyclic durability or charge and discharge efficiency can be improved by a combined use of a chain carbonate ester and a cyclic carbonate ester.

Further, in the lithium secondary battery using the surface modified lithium-containing composite oxide of the present invention as the cathode active material, a gel polymer electrolyte containing a vinylidene fluoride-hexafluoropropylene copolymer (for example, KYNAR manufactured by ELF Atochem) or a vinylidene fluoride-perfluoropropyl vinyl ether copolymer may be employed. As the solute to be added to the electrolytic solvent or the polymer electrolyte, at least one member of lithium salts is preferably used, wherein e.g. $ClO_4^-$, $CF_3SO_3^-$, $BE_4^-$, $PF_6^-$, $AsF_6^-$, $SbF_6^-$, $CF_3CO_2^-$ or $(CF_3SO_2)_2N^-$ is anion. The lithium salt is preferably added in a concentration of from 0.2 to 2.0 mol/l (liter) to the electrolytic solvent or the polymer electrolyte. If the concentration departs from this range, ionic conductivity will decrease, and the electrical conductivity of the electrolyte will decrease. The concentration is particularly preferably from 0.5 to 1.5 mol/l.

In the lithium battery using the surface modified lithium-containing composite oxide of the present invention as the cathode active material, a material which can occlude and discharge lithium ions may be used for the anode active material. The material forming the anode active material is not particularly limited, however, lithium metal, a lithium alloy, a carbon material, an oxide comprising, as a main component, a metal of Group 14 or Group 15 in the Periodic Table, a carbon compound, a silicon carbide compound, a silicon oxide compound, titanium sulfide or a boron carbide compound may, for example, be mentioned. As the carbon material, one having an organic material thermally decomposed under various thermal decomposition conditions, artificial graphite, natural graphite, soil graphite, exfoliated graphite or flake graphite may, for example, be used. Further, as the oxide, a compound comprising tin oxide as a main component can be used. As the anode current collector, a copper foil or a nickel foil may, for example, be used. The negative electrode is produced preferably by kneading the anode active material with an organic solvent to form a slurry, which is applied to the metal foil current collector, dried and pressed.

There are no particular restrictions on the shape of the lithium battery using the surface modified lithium-containing composite oxide of the present invention as the cathode active material. The shape is selected from a sheet shape, a film shape, a folded shape, a wound cylinder with bottom, a button shape and so on, depending upon the intended purpose.

EXAMPLES

Now, the present invention will be described in further detail with reference to Examples. However, the present invention is by no means restricted to such specific Examples.

Example 1

In an aqueous solution having 1.93 g of magnesium carbonate, 20.89 g of aluminum maleate having an Al content of 2.65% by weight and 7.76 g of citric acid monohydrate dissolved in 23.12 g of water, an aqueous solution obtained by mixing 1.29 g of a zirconium ammonium carbonate aqueous solution having a zirconium content of 14.5% by weight and 197.32 g of cobalt oxyhydroxide with an average particle size of 13 μm and a cobalt content of 60.0% by weigh were added and mixed. The resultant mixture was dried in a constant-temperature oven kept at 80° C., and the dried mixture was mixed with 77.69 g of lithium carbonate having a lithium content of 18.7% by weight in a mortar, and fired at 990° C. for 14 hours in an oxygen-containing atmosphere, followed by crushing to obtain a lithium-containing composite oxide having a composition of $Li_{1.02}(Co_{0.979}Mg_{0.01}Al_{0.01}Zr_{0.001})_{0.98}O_2$.

To 200 g of the above lithium-containing composite oxide, a coating solution having a pH of 3.6, having 11.98 g of a titanium lactate aqueous solution having a Ti content of 8.20% by weight and 0.61 g of lithium carbonate having a lithium content of 18.7% by weight dissolved in 57.41 g of water, was added, followed by drying at 120° C. for 4 hours with mixing and stirring to obtain lithium titanium-impregnated particles. FIG. 1 shows a TG-DTA chart measured by heating the obtained lithium titanium-impregnated particles from room temperature to 1,000° C. Further, the obtained lithium titanium-impregnated particles were subjected to heat treatment at 700° C. for 12 hours in an oxygen-containing atmosphere, followed by crushing to obtain a powder of a surface modified lithium-containing composite oxide having an average particle size D50 of 13.8 μm, D10 of 8.4 μm, D90 of 21.4 μm and a specific surface area of 0.26 m$^2$/g obtained by the BET method. The amount of titanium contained in the surface layer of the surface modified lithium-containing composite oxide was 1.0 mol % to the lithium-containing composite oxide as a base material. The alkali amount of the obtained surface modified lithium-containing composite oxide was 0.006% by weight.

Figure 2:
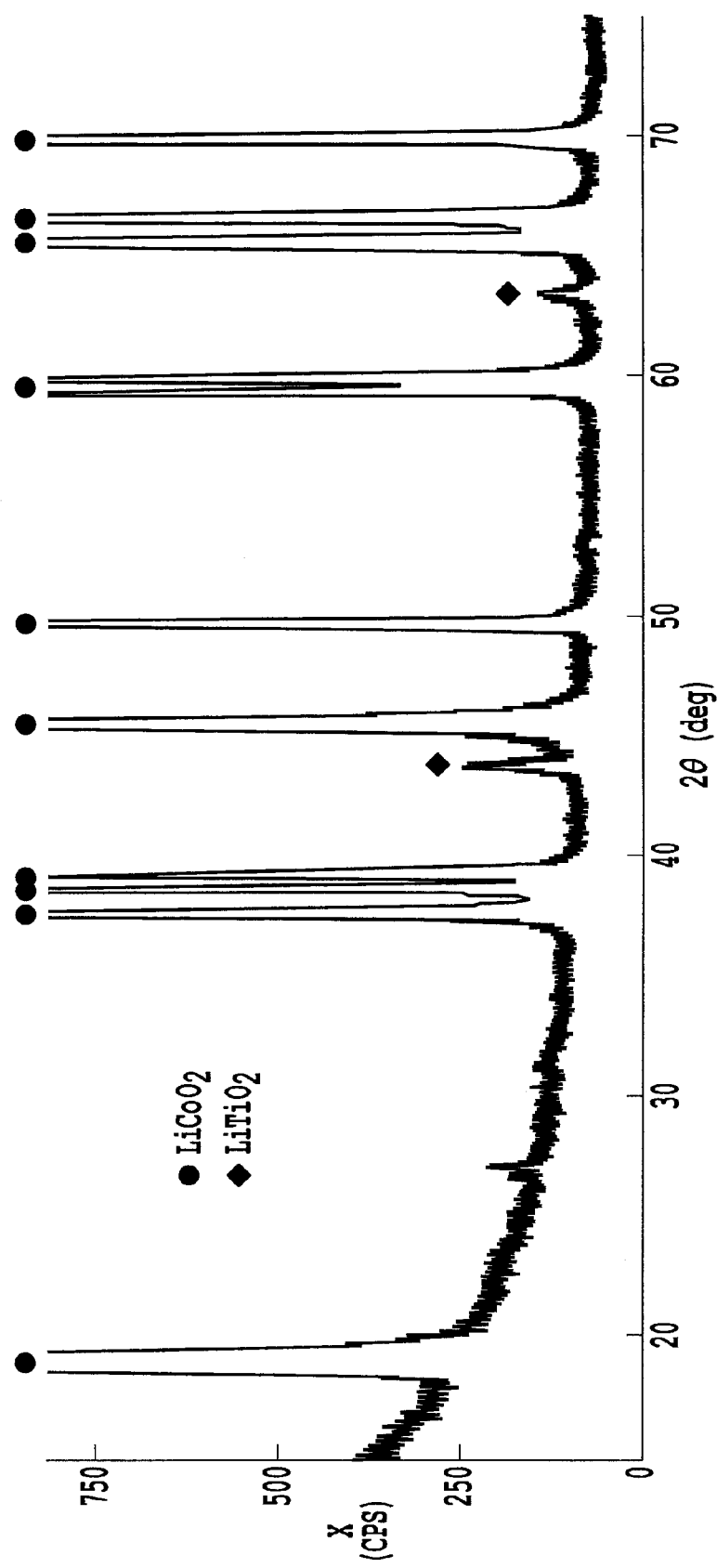
FIG. 2: X-ray diffraction spectrum of a surface modified lithium-containing composite oxide obtained in Example 1.

With respect to the powder of the surface modified lithium-containing composite oxide, an X-ray diffraction spectrum obtained with an X-ray diffraction apparatus (RINT 2500 model, manufactured by Rigaku Corporation) is shown in FIG. 2. In FIG. 2, in addition to the spectrum of $LiCoO_2$, a spectrum of $LiTiO_2$ was confirmed.

Further, with respect to the powder of the surface modified lithium-containing composite oxide, an X-ray diffraction spectrum was obtained with an X-ray diffraction apparatus (RINT 2100 model, manufactured by Rigaku Corporation). In a powder X-ray diffraction using CuKα rays, the half value width of the diffraction peak of (110) plane at 2θ=66.5±1° was 0.110°. The press density of the powder was 2.93 g/cm$^3$.

The above powder of the surface modified lithium-containing composite oxide, acetylene black and a polyvinylidene fluoride powder were mixed at a weight ratio of 90/5/5, and N-methylpyrrolidone was added to form a slurry, which was applied onto one side of an aluminum foil having a thickness of 20 μm, by a doctor blade. After drying, roll pressing was carried out five times to obtain a positive electrode sheet for a lithium battery.

Then, three simplified sealed cell type lithium batteries of stainless steel were assembled in an argon grove box, using a punched sheet from the positive electrode sheet as a positive electrode, a metal lithium foil having a thickness of 500 μm as a negative electrode, a nickel foil of 20 μm as a negative electrode current collector, a porous polypropylene having a thickness of 25 μm as a separator and an $LiPF_6$/EC+DEC (1:1) solution (which means a mixed solution of EC and DEC in a volume ratio (1:1) whose solute is $LiPF_6$; the same also applies to solvents as mentioned hereinafter) in a concentration of 1M as an electrolyte.

One battery out of the above three was charged up to 4.3 V at a load current of 75 mA per 1 g of the cathode active material at 25° C., and discharged down to 2.5 V at a load current of 75 mA per 1 g of the cathode active material, thereby obtaining an initial discharge capacity, and with this battery, the charge and discharge cycle test was sequentially carried out 30 times. Further, it was discharged down to 2.5 V at a high load current of 225 mA per 1 g of the cathode active material, whereby the capacity and the voltage were obtained. As a result, the initial weight capacity density of the positive electrode layer between 2.5 and 4.3 V at 25° C. was 153 mAh/g, the initial charge and discharge efficiency was 94.9%, the initial average electric potential during discharge was 3.95 V, the capacity retention after 30 charge and discharge cycles was 99.1% and the average electric potential during discharge was 3.97 V. The capacity ratio of the case of discharging at a current of 225 mA to the case of discharging at a current of 75 mA per 1 g was 94.3%, and the average electric potential during discharge was 3.86 V.

Further, one battery out of the above three was charged up to 4.5 V at a load current of 75 mA per 1 g of the cathode active material at 25° C., and discharged down to 2.5 V at a load current of 75 mA per 1 g of the cathode active material, thereby obtaining an initial discharge capacity, and with this battery, the charge and discharge cycle test was sequentially carried out 50 times. As a result, the initial weight capacity density of the positive electrode layer between 2.5 and 4.5 V at 25° C. was 184 mAh/g, the initial charge and discharge efficiency was 93.1%, the initial average electric potential during discharge was 4.01 V, the capacity retention after 50 charge and discharge cycles was 88.5% and the average electric potential during discharge was 3.86 V.

Moreover, the other battery was charged at 4.3 V for 10 hours, and then disassembled in the argon grove box. The positive electrode sheet after charged was taken out, washed, punched into a diameter of 3 mm, and then sealed with EC in an aluminum capsule. Then, while the temperature was raised at a rate of 5° C./min by a scanning differential calorimeter, a heat generation starting temperature was measured. As a result, the heat generation starting temperature of a heat generation curve of the 4.3 V-charged product was 169° C.

Example 2

To 200 g of a powder of a lithium-containing composite oxide having a composition of $Li_{1.02}(Co_{0.979}Mg_{0.01}Al_{0.01}Zr_{0.001})_{0.98}O_2$ prepared in the same manner as in Example 1, a coating solution having a pH of 5.5 having 11.98 g of a titanium lactate aqueous solution having a Ti content of 8.20% by weight and 1.07 g of lithium carbonate having a lithium content of 18.7% by weight dissolved in 56.95 g of water, was added, followed by drying at 120° C. for 4 hours with mixing and stirring. The obtained powder of lithium titanium-impregnated particles was subjected to heat treatment at 700° C. for 12 hours in an oxygen-containing atmosphere, followed by crushing to obtain a powder of a surface modified lithium-containing composite oxide having an average particle size D50 of 13.6 μm, D10 of 8.4 μm, D90 of 20.74 μm and a specific surface area of 0.25 m$^2$/g obtained by the BET method. The amount of titanium contained in the surface layer of the surface modified lithium-containing composite oxide was 1.0 mol % to the lithium-containing composite oxide as a base material. The alkali amount in the obtained powder of the surface modified lithium-containing composite oxide was 0.009% by weight.

Further, with respect to the powder of the surface modified lithium-containing composite oxide, an X-ray diffraction spectrum was obtained with an X-ray diffraction apparatus (RINT 2100 model, manufactured by Rigaku Corporation), and the existence of $LiTiO_2$ peaks was confirmed. In a powder X-ray diffraction using CuKα rays, the half value width of the diffraction peak of (110) plane at 2θ=66.5±1° was 0.109°. The press density of the powder was 2.93 g/cm$^3$.

An electrode and batteries were produced and evaluated in the same manner as in Example 1 except that a positive electrode sheet was obtained by using the above surface modified lithium-containing composite oxide.

As a result, the initial weight capacity density of the positive electrode layer between 2.5 and 4.3 V at 25° C. was 151 mAh/g, the initial charge and discharge efficiency was 93.9%, the initial average electric potential during discharge was 3.96 V, the capacity retention after 30 charge and discharge cycles was 99.1%, and the average electric potential during discharge was 3.97 V. The capacity ratio of the case of discharging at a current of 225 mA to the case of discharging at a current of 75 mA per 1 g was 94.3%, and the average electric potential during discharge was 3.87 V.

Further, the initial weight capacity density of the positive electrode layer between 2.5 and 4.5 V at 25° C. was 183 mAh/g, the initial charge and discharge efficiency was 92.8%, the initial average electric potential during discharge was 4.00

V, the capacity retention after 50 charge and discharge cycles was 98.2% and the average electric potential during discharge was 3.83 V. Further, while the temperature was raised at a rate of 5° C./min by a scanning differential calorimeter, a heat generation starting temperature was measured, and as a result, the heat generation starting temperature of a heat generation curve of the 4.3 V-charged product was 170° C.

Example 3

To 200 g of a powder of a lithium-containing composite oxide having a composition of $Li_{1.02}(Co_{0.979}Mg_{0.01}Al_{0.01}Zr_{0.001})_{0.98}O_2$ prepared in the same manner as in Example 1, a coating solution having a pH of 7.2 having 11.98 g of a titanium lactate aqueous solution having a Ti content of 8.20% by weight and 1.52 g of lithium carbonate having a lithium content of 18.7% by weight dissolved in 56.49 g of water, was added, followed by drying at 120° C. for 4 hours with mixing and stirring. The obtained powder was subjected to heat treatment at 700° C. for 12 hours in an oxygen-containing atmosphere, followed by crushing to obtain a powder of a surface modified lithium-containing composite oxide having an average particle size D50 of 12.7 μm, D10 of 7.7 μm, D90 of 19.3 μm and a specific surface area of 0.26 m$^2$/g obtained by the BET method. The amount of titanium contained in the surface layer of the surface modified lithium-containing composite oxide was 1.0 mol % to the lithium-containing composite oxide as a base material. The alkali amount in the obtained powder of the surface modified lithium-containing composite oxide was 0.014% by weight.

With respect to the powder of the surface modified lithium-containing composite oxide, an X-ray diffraction spectrum was obtained with an X-ray diffraction apparatus (RINT 2100 model, manufactured by Rigaku Corporation), and the existence of LiTiO$_2$ peaks was confirmed. In a powder X-ray diffraction using CuKα rays, the half value width of the diffraction peak of (110) plane at 2θ=66.5±1° was 0.106°. The press density of the powder was 2.97 g/cm$^3$.

An electrode and batteries were produced and evaluated in the same manner as in Example 1 except that a positive electrode sheet was obtained by using the above surface modified lithium-containing composite oxide.

As a result, the initial weight capacity density of the positive electrode layer between 2.5 and 4.3 V at 25° C. was 150 mAh/g, the initial charge and discharge efficiency was 93.0%, the initial average electric potential during discharge was 3.97 V, the capacity retention after 30 charge and discharge cycles was 98.7%, and the average electric potential during discharge was 3.95 V. The capacity ratio of the case of discharging at a current of 225 mA to the case of discharging at a current of 75 mA per 1 g was 92.9%, and the average electric potential during discharge was 3.85 V.

Further, the initial weight capacity density of the positive electrode layer between 2.5 and 4.5 V at 25° C. was 182 mAh/g, the initial charge and discharge efficiency was 92.3%, the initial average electric potential during discharge was 4.01 V, the capacity retention after 50 charge and discharge cycles was 55.9%, and the average electric potential during discharge was 3.32 V. Further, while the temperature was raised at a rate of 5° C./min by a scanning differential calorimeter, a heat generation starting temperature was measured, and as a result, the heat generation starting temperature of a heat generation curve of the 4.3 V-charged product was 169° C.

Example 4

To 200 g of a powder of a lithium-containing composite oxide having a composition of $Li_{1.02}$ $(Co_{0.979}Mg_{0.01}Al_{0.01}Zr_{0.001})_{0.98}O_2$ prepared in the same manner as in Example 1, a coating solution having a pH of 3.4 having 11.98 g of a titanium lactate aqueous solution having a Ti content of 8.20% by weight and 0.51 g of lithium carbonate having a lithium content of 18.7% by weight dissolved in 57.51 g of water, was added, followed by drying at 120° C. for 4 hours with mixing and stirring. The obtained powder was subjected to heat treatment at 500° C. for 12 hours in an oxygen-containing atmosphere, followed by crushing to obtain a powder of a surface modified lithium-containing composite oxide having an average particle size D50 of 13.9 μm, D10 of 8.5 μm, D90 of 21.6 μm and a specific surface area of 0.48 m$^2$/g obtained by the BET method. The amount of titanium contained in the surface layer of the surface modified lithium-containing composite oxide was 1.0 mol % to the lithium-containing composite oxide as a base material. The alkali amount in the obtained powder of the surface modified lithium-containing composite oxide was 0.018% by weight.

Further, with respect to the powder of the surface modified lithium-containing composite oxide, an X-ray diffraction spectrum was obtained with an X-ray diffraction apparatus (RINT 2100 model, manufactured by Rigaku Corporation), and the existence of LiTiO$_2$ peaks was confirmed. In a powder X-ray diffraction using CuKα rays, the half value width of the diffraction peak of (110) plane at 2θ=66.5±1° was 0.114°. The press density of the powder was 2.97 g/cm$^3$.

An electrode and batteries were produced and evaluated in the same manner as in Example 1 except that a positive electrode sheet was obtained by using the above surface modified lithium-containing composite oxide.

As a result, the initial weight capacity density of the positive electrode layer between 2.5 and 4.3 V at 25° C. was 149 mAh/g, the initial charge and discharge efficiency was 92.9%, the initial average electric potential during discharge was 3.96 V, the capacity retention after 30 charge and discharge cycles was 99.5%, and the average electric potential during discharge was 3.96 V. The capacity ratio of the case of discharging at a current of 225 mA to the case of discharging at a current of 75 mA per 1 g was 94.1%, the average electric potential during discharge was 3.86 V.

Further, the initial weight capacity density of the positive electrode layer between 2.5 and 4.5 V at 25° C. was 179 mAh/g, the initial charge and discharge efficiency was 92.5%, the initial average electric potential during discharge was 4.02 V, the capacity retention after 50 charge and discharge cycles was 88.6%, and the average electric potential during discharge was 3.91 V. Further, while the temperature was raised at a rate of 5° C./min by a scanning differential calorimeter, a heat generation starting temperature was measured, and as a result, the heat generation starting temperature of a heat generation curve of the 4.3 V-charged product was 169° C.

Example 5

To 200 g of a powder of a lithium-containing composite oxide having a composition of $Li_{1.02}(CO_{00.979}Mg_{0.01}Al_{0.01}Zr_{0.001})_{0.98}O_2$ prepared in the same manner as in Example 1, a coating solution having a pH of 3.4 having 11.98 g of a titanium lactate aqueous solution having a Ti content of 8.20% by weight and 0.51 g of lithium carbonate having a lithium content of 18.7% by weight dissolved in 57.51 g of water, was added, followed by drying at 120° C. for 4 hours with mixing and stirring. The obtained powder was subjected to heat treatment at 700° C. for 12 hours in an oxygen-containing atmosphere, followed by crushing to obtain a powder of a surface modified lithium-containing composite oxide having an average particle size D50 of 13.5 μm, D10 of 8.3 μm, D90 of 20.7 μm and a specific surface area of 0.27 m$^2$/g obtained by the BET method. The amount of titanium contained in the surface layer of the surface modified lithium-containing composite oxide was 1.0 mol % to the lithium-containing composite oxide as a base material. The alkali amount in the obtained powder of the surface modified lithium-containing composite oxide was 0.006% by weight.

With respect to the powder of the surface modified lithium-containing composite oxide, an X-ray diffraction spectrum was obtained with an X-ray diffraction apparatus (RINT 2100 model, manufactured by Rigaku Corporation), and the existence of LiTiO$_2$ peaks was confirmed. In a powder X-ray diffraction using CuKα rays, the half value width of the diffraction peak of (110) plane at 2θ=66.5±1° was 0.113°. The press density of the powder was 2.97 g/cm$^3$.

An electrode and batteries were produced and evaluated in the same manner as in Example 1 except that a positive electrode sheet was obtained by using the above surface modified lithium-containing composite oxide.

As a result, the initial weight capacity density of the positive electrode layer between 2.5 and 4.3 V at 25° C. was 154 mAh/g, the initial charge and discharge efficiency was 94.7%, the initial average electric potential during discharge was 3.96 V, the capacity retention after 30 charge and discharge cycles was 99.5%, and the average electric potential during discharge was 3.97 V. The capacity ratio of the case of discharging at a current of 225 mA to the case of discharging at a current of 75 mA per 1 g was 95.1%, and the average electric potential during discharge was 3.85 V.

Further, the initial weight capacity density of the positive electrode layer between 2.5 and 4.5 V at 25° C. was 185 mAh/g, the initial charge and discharge efficiency was 94.4%, the initial average electric potential during discharge was 4.02 V, the capacity retention after 50 charge and discharge cycles was 97.6%, and the average electric potential during discharge was 4.00 V. Further, while the temperature was raised at a rate of 5° C./min by a scanning differential calorimeter, a heat generation starting temperature was measured, and as a result, the heat generation starting temperature of a heat generation curve of the 4.3 V-charged product was 170° C.

Example 6

To 200 g of a powder of a lithium-containing composite oxide having a composition of Li$_{1.02}$(Co$_{0.979}$Mg$_{0.01}$Al$_{0.01}$Zr$_{0.001}$)$_{0.98}$O$_2$ prepared in the same manner as in Example 1, a coating solution having a pH of 3.6 having 11.98 g of a titanium lactate aqueous solution having a Ti content of 8.20% by weight and 0.61 g of lithium carbonate having a lithium content of 18.7% by weight dissolved in 57.41 g of water, was added, followed by drying at 120° C. for 4 hours with mixing and stirring. The obtained powder was subjected to heat treatment at 500° C. for 12 hours in an oxygen-containing atmosphere, followed by crushing to obtain a powder of a surface modified lithium-containing composite oxide having an average particle size D50 of 14.6 μm, D10 of 8.7 μm, D90 of 22.5 μm and a specific surface area of 0.43 m$^2$/g obtained by the BET method. The amount of titanium contained in the surface layer of the surface modified lithium-containing composite oxide was 1.0 mol % to the lithium-containing composite oxide as a base material. The alkali amount in the obtained powder of the surface modified lithium-containing composite oxide was 0.018% by weight.

Further, with respect to the powder of the surface modified lithium-containing composite oxide, an X-ray diffraction spectrum was obtained with an X-ray diffraction apparatus (RINT 2100 model, manufactured by Rigaku Corporation), and the existence of LiTiO$_2$ peaks was confirmed. In a powder X-ray diffraction using CuKα rays, the half value width of the diffraction peak of (110) plane at 2θ=66.5±1° was 0.110°. The press density of the powder was 2.87 g/cm$^3$.

An electrode and batteries were produced and evaluated in the same manner as in Example 1 for evaluation except that a positive electrode sheet was obtained by using the above surface modified lithium-containing composite oxide.

As a result, the initial weight capacity density of the positive electrode layer between 2.5 and 4.3 V at 25° C. was 150 mAh/g, the initial charge and discharge efficiency was 92.9%, the initial average electric potential during discharge was 3.95 V, the capacity retention after 30 charge and discharge cycles was 99.1%, and the average electric potential during discharge was 3.95 V. The capacity ratio of the case of discharging at a current of 225 mA to the case of discharging at a current of 75 mA per 1 g was 91.9%, and the average electric potential during discharge was 3.81 V.

Further, the initial weight capacity density of the positive electrode layer between 2.5 and 4.5 V at 25° C. was 178 mAh/g, the initial charge and discharge efficiency was 92.0%, the initial average electric potential during discharge was 4.02 V, the capacity retention after 50 charge and discharge cycles was 84.8%, and the average electric potential during discharge was 3.76 V. Further, while the temperature was raised at a rate of 5° C./min by a scanning differential calorimeter, a heat generation starting temperature was measured, and as a result, the heat generation starting temperature of a heat generation curve of the 4.3 V-charged product was 168° C.

Example 7

To 200 g of a powder of a lithium-containing composite oxide having a composition of Li$_{1.02}$(Co$_{0.979}$Mg$_{0.01}$Al$_{0.01}$Zr$_{0.001}$)$_{0.98}$O$_2$ prepared in the same manner as in Example 1, a coating solution having a pH of 3.6 having 11.98 g of a titanium lactate aqueous solution having a Ti content of 8.20% by weight and 0.61 g of lithium carbonate having a lithium content of 18.7% by weight dissolved in 57.41 g of water, was added, followed by drying at 120° C. for 4 hours with mixing and stirring. The obtained powder was subjected to heat treatment at 600° C. for 12 hours in an oxygen-containing atmosphere, followed by crushing to obtain a powder of a surface modified lithium-containing composite oxide having an average particle size D50 of 13.3 μm, D10 of 8.1 μm, D90 of 20.6 μm and a specific surface area of 0.34 m$^2$/g obtained by the BET method. The amount of titanium contained in the surface layer of the surface modified lithium-containing composite oxide was 1.0 mol % to the lithium-containing composite oxide as a base material. The alkali amount in the obtained powder of the surface modified lithium-containing composite oxide was 0.009% by weight.

With respect to the powder of the surface modified lithium-containing composite oxide, an X-ray diffraction spectrum was obtained with an X-ray diffraction apparatus (RINT 2100 model, manufactured by Rigaku Corporation), and the existence of LiTiO$_2$ peaks was confirmed. In a powder X-ray diffraction using CuKα rays, the half value width of the diffraction peak of (110) plane at 2θ=66.5±1° was 0.106°. The press density of the powder was 2.90 g/cm$^3$.

An electrode and batteries were produced and evaluated in the same manner as in Example 1 for evaluation except that a positive electrode sheet was obtained by using the above surface modified lithium-containing composite oxide.

As a result, the initial weight capacity density of the positive electrode layer between 2.5 and 4.3 V at 25° C. was 152 mAh/g, the initial charge and discharge efficiency was 94.5%, the initial average electric potential during discharge was 3.95 V, the capacity retention after 30 charge and discharge cycles was 98.6%, and the average electric potential during discharge was 3.96 V. The capacity ratio of the case of discharging at a current of 225 mA to the case of discharging at a current of 75 mA per 1 g was 94.1%, and the average electric potential during discharge was 3.83 V.

Further, the initial weight capacity density of the positive electrode layer between 2.5 and 4.5 V at 25° C. was 182 mAh/g, the initial charge and discharge efficiency was 93.6%, the initial average electric potential during discharge was 4.00 V, the capacity retention after 50 charge and discharge cycles was 90.9%, and the average electric potential during discharge was 3.85 V. Further, while the temperature was raised at a rate of 5° C./min by a scanning differential calorimeter, a heat generation starting temperature was measured, and as a result, the heat generation starting temperature of a heat generation curve of the 4.3 V-charged product was 169° C.

Example 8

To 200 g of a powder of a lithium-containing composite oxide having a composition of $Li_{1.02}(Co_{0.979}Mg_{0.01}Al_{0.01}Zr_{0.001})_{0.98}O_2$ prepared in the same manner as in Example 1, a coating solution having a pH of 3.6 having 11.98 g of a titanium lactate aqueous solution having a Ti content of 8.20% by weight and 0.61 g of lithium carbonate having a lithium content of 18.7% by weight dissolved in 57.41 g of water, was added, followed by drying at 120° C. for 4 hours with mixing and stirring. The obtained powder was subjected to heat treatment at 800° C. for 12 hours in an oxygen-containing atmosphere, followed by crushing to obtain a powder of a surface modified lithium-containing composite oxide having an average particle size D50 of 15.3 μm, D10 of 9.2 μm, D90 of 23.3 μm and a specific surface area of 0.24 $m^2/g$ obtained by the BET method. The amount of titanium contained in the surface layer of the surface modified lithium-containing composite oxide was 1.0 mol % to the lithium-containing composite oxide as a base material. The alkali amount in the obtained powder of the lithium-containing composite oxide was 0.009% by weight.

Further, with respect to the powder of the surface modified lithium-containing composite oxide, an X-ray diffraction spectrum was obtained with an X-ray diffraction apparatus (RINT 2100 model, manufactured by Rigaku Corporation), and the existence of $LiTiO_2$ peaks was confirmed. In a powder X-ray diffraction using CuKα rays, the half value width of the diffraction peak of (110) plane at 2θ=66.5±1° was 0.109°. The press density of the powder was 2.93 $g/cm^3$.

An electrode and batteries were produced and evaluated in the same manner as in Example 1 except that a positive electrode sheet was obtained by using the above surface modified lithium-containing composite oxide.

As a result, the initial weight capacity density of the positive electrode layer between 2.5 and 4.3 V at 25° C. was 152 mAh/g, the initial charge and discharge efficiency was 94.8%, the initial average electric potential during discharge was 3.95 V, the capacity retention after 30 charge and discharge cycles was 99.0%, and the average electric potential during discharge was 3.96 V. The capacity ratio of the case of discharging at a current of 225 mA to the case of discharging at a current of 75 mA per 1 g was 93.3%, and the average electric potential during discharge was 3.85 V.

Further, the initial weight capacity density of the positive electrode layer between 2.5 and 4.5 V at 25° C. was 182 mAh/g, the initial charge and discharge efficiency was 94.7%, the initial average electric potential during discharge was 4.02 V, the capacity retention after 50 charge and discharge cycles was 91.2%, and the average electric potential during discharge was 3.85 V. Further, while the temperature was raised at a rate of 5° C./min by a scanning differential calorimeter, a heat generation starting temperature was measured, and as a result, the heat generation starting temperature of a heat generation curve of the 4.3 V-charged product was 170° C.

Example 9

To 200 g of a powder of a lithium-containing composite oxide having a composition of $Li_{1.02}(Co_{0.979}Mg_{0.01}Al_{0.01}Zr_{0.001})_{0.98}O_2$ prepared in the same manner as in Example 1, a coating solution having a pH of 3.6 having 11.98 g of a titanium lactate aqueous solution having a Ti content of 8.20% by weight and 0.61 g of lithium carbonate having a lithium content of 18.7% by weight dissolved in 57.41 g of water, was added, followed by drying at 120° C. for 4 hours with mixing and stirring. The obtained powder was subjected to heat treatment at 900° C. for 12 hours in an oxygen-containing atmosphere, followed by crushing to obtain a powder of a surface modified lithium-containing composite oxide having an average particle size D50 of 19.6 μm, D10 of 10.5 μm, D90 of 33.4 μm and a specific surface area of 0.22 $m^2/g$ obtained by the BET method. The amount of titanium contained in the surface layer of the surface modified lithium-containing composite oxide was 1.0 mol % to the lithium-containing composite oxide as a base material. The alkali amount in the obtained powder of the surface modified lithium-containing composite oxide was 0.008% by weight.

With respect to the powder of the surface modified lithium-containing composite oxide, an X-ray diffraction spectrum was obtained with an X-ray diffraction apparatus (RINT 2100 model, manufactured by Rigaku Corporation), and the existence of $LiTiO_2$ peaks was confirmed. In a powder X-ray diffraction using CuKα rays, the half value width of the diffraction peak of (110) plane at 2θ=66.5±1° was 0.111°. The press density of the powder was 2.89 $g/cm^3$.

An electrode and batteries were produced and evaluated in the same manner as in Example 1 for evaluation except that a positive electrode sheet was obtained by using the above surface modified lithium-containing composite oxide.

As a result, the initial weight capacity density of the positive electrode layer was between 2.5 and 4.3 V at 25° C. 153 mAh/g, the initial charge and discharge efficiency was 94.9%, the initial average electric potential during discharge was 3.95 V, the capacity retention after 30 charge and discharge cycles was 98.7%, and the average electric potential during discharge was 3.96 V. The capacity ratio of the case of discharging at a current of 225 mA to the case of discharging at a current of 75 mA per 1 g was 93.4%, and the average electric potential during discharge was 3.84 V.

Further, the initial weight capacity density of the positive electrode layer was between 2.5 and 4.5 V at 25° C. 183 mAh/g, the initial charge and discharge efficiency was 93.7%, the initial average electric potential during discharge was 4.01 V, the capacity retention after 50 charge and discharge cycles was 91.1%, and the average electric potential during discharge was 3.87 V. Further, while the temperature was raised at a rate of 5° C./min by a scanning differential calorimeter, a heat generation starting temperature was measured, and as a result, the heat generation starting temperature of a heat generation curve of the 4.3 V-charged product was 168° C.

Example 10

To 200 g of a powder of a lithium-containing composite oxide having a composition of $Li_{1.02}$ ($Co_{0.979}Mg_{0.01}Al_{0.01}Zr_{0.001})_{0.98}O_2$ prepared in the same manner as in Example 1, a coating solution having a pH of 3.4 having 1.20 g of a titanium lactate aqueous solution having a Ti content of 8.20% by weight and 0.05 g of lithium carbonate having a lithium content of 18.7% by weight dissolved in 68.75 g of water, was added, followed by drying at 120° C. for 4 hours with mixing and stirring. The obtained powder was subjected to heat treatment at 500° C. for 12 hours in an oxygen-containing atmosphere, followed by crushing to obtain a powder of a surface modified lithium-containing composite oxide having an average particle size D50 of 12.2 μm, D10 of 6.9 μm, D90 of 18.9 μm and a specific surface area of 0.28 $m^2/g$ obtained by the BET method. The amount of titanium contained in the surface layer of the surface modified lithium-containing composite oxide was 0.1 mol % to the lithium-containing composite oxide as a base material. The alkali amount in the obtained powder of the surface modified lithium-containing composite oxide was 0.009% by weight.

With respect to the powder of the surface modified lithium-containing composite oxide, an X-ray diffraction spectrum was obtained with an X-ray diffraction apparatus (RINT 2100 model, manufactured by Rigaku Corporation), and the existence of $LiTiO_2$ peaks was confirmed. In a powder X-ray diffraction using CuKα rays, the half value width of the diffraction peak of (110) plane at 2θ=66.5±1° was 0.110°. The press density of the powder was 3.00 $g/cm^3$.

An electrode and batteries were produced and evaluated in the same manner as in Example 1 except that a positive electrode sheet was obtained by using the above surface modified lithium-containing composite oxide.

As a result, the initial weight capacity density of the positive electrode layer between 2.5 and 4.3 V at 25° C. was 151 mAh/g, the initial charge and discharge efficiency was 93.2%, the initial average electric potential during discharge was 3.95 V, the capacity retention after 30 charge and discharge cycles was 99.5%, and the average electric potential during discharge was 3.97 V. The capacity ratio of the case of discharging at a current of 225 mA to the case of discharging at a current of 75 mA per 1 g was 93.5%, and the average electric potential during discharge was 3.84 V.

Further, the initial weight capacity density of the positive electrode layer between 2.5 and 4.5 V at 25° C. was 182 mAh/g, the initial charge and discharge efficiency was 92.7%, the initial average electric potential during discharge was 4.01 V, the capacity retention after 50 charge and discharge cycles was 95.1%, and the average electric potential during discharge was 3.96 V. Further, while the temperature was raised at a rate of 5° C./min by a scanning differential calorimeter, a heat generation starting temperature was measured, and as a result, the heat generation starting temperature of a heat generation curve of the 4.3 V-charged product was 168° C.

Example 11

To 200 g of a powder of a lithium-containing composite oxide having a composition of $Li_{1.02}(Co_{0.979}Mg_{0.01}Al_{0.01}Zr_{0.001})_{0.98}O_2$ prepared in the same manner as in Example 1, a coating solution having a pH of 3.4 having 5.99 g of a titanium lactate aqueous solution having a Ti content of 8.20% by weight and 0.25 g of lithium carbonate having a lithium content of 18.7% by weight dissolved in 63.75 g of water, was added, followed by drying at 120° C. for 4 hours with mixing and stirring. The obtained powder was subjected to heat treatment at 500° C. for 12 hours in an oxygen-containing atmosphere, followed by crushing to obtain a powder of a surface modified lithium-containing composite oxide having an average particle size D50 of 12.9 μm, D10 of 8.1 μm, D90 of 19.7 μm and a specific surface area of 0.36 $m^2/g$ obtained by the BET method. The amount of titanium contained in the surface layer of the surface modified lithium-containing composite oxide was 0.5 mol % to the lithium-containing composite oxide as a base material. The alkali amount in the obtained powder of the surface modified lithium-containing composite oxide was 0.018% by weight.

With respect to the powder of the surface modified lithium-containing composite oxide, an X-ray diffraction spectrum was obtained with an X-ray diffraction apparatus (RINT 2100 model, manufactured by Rigaku Corporation), and the existence of $LiTiO_2$ peaks was confirmed. In a powder X-ray diffraction using CuKα rays, the half value width of the diffraction peak of (110) plane at 2θ=66.5±1° was 0.111°. The press density of the powder was 2.98 $g/cm^3$.

An electrode and batteries were produced and evaluated in the same manner as in Example 1 except that a positive electrode sheet was obtained by using the above surface modified lithium-containing composite oxide.

As a result, the initial weight capacity density of the positive electrode layer between 2.5 and 4.3 V at 25° C. was 151 mAh/g, the initial charge and discharge efficiency was 93.3%, the initial average electric potential during discharge was 3.96 V, the capacity retention after 30 charge and discharge cycles was 98.9%, and the average electric potential during discharge was 3.96 V. The capacity ratio of the case of discharging at a current of 225 mA to the case of discharging at a current of 75 mA per 1 g was 93.2%, and the average electric potential during discharge was 3.86 V.

Further, the initial weight capacity density of the positive electrode layer between 2.5 and 4.5 V at 25° C. was 182 mAh/g, the initial charge and discharge efficiency was 92.0%, the initial average electric potential during discharge was 4.03 V, the capacity retention after 50 charge and discharge cycles was 66.4%, and the average electric potential during discharge was 3.63 V. Further, while the temperature was raised at a rate of 5° C./min by a scanning differential calorimeter, a heat generation starting temperature was measured, and as a result, the heat generation starting temperature of a heat generation curve of the 4.3 V-charged product was 170° C.

Example 12

500 g of deionized water was added in a reactor, and stirred at 400 rpm while maintaining the temperature at 50° C. An aqueous sulfate solution containing 1.5 mol/L of nickel sulfate, 1.5 mol/L of cobalt sulfate and 1.5 mol/L of manganese sulfate, and an aqueous ammonia solution were simultaneously continuously supplied thereto at a rate of 1.2 L/hr and 0.03 L/hr respectively, while 18 mol/L of an aqueous sodium hydroxide solution was supplied to the reactor to maintain the pH at 11. The liquid amount in the reaction system was controlled by suction filtration through a filter, the mixture was aged at 50° C. for 24 hours, a coprecipitated slurry was filtrated and washed with water, followed by drying at 70° C. to obtain a nickel cobalt manganese-containing composite hydroxide. Particles of the obtained composite hydroxide were spherical, and their average particle size was 11 μm. Further, the ratio of nickel, cobalt and manganese contained in the composite hydroxide was Ni:Co:Mn=0.33:0.34:0.33 in molar ratio based on their total. Further, the total amount of nickel, cobalt and manganese contained in the composite hydroxide was 61.7% by weight.

300 g of the obtained composite hydroxide and 126.6 g of lithium carbonate having a lithium content of 18.7% by weight were mixed, and the mixture was fired under air atmosphere at 990° C. for 14 hours, crushed and mixed to obtain a substantially spherical lithium-containing composite oxide powder represented by $Li[Li_{0.03}(Ni_{0.33}Co_{0.34}Mn_{0.33})_{0.97}]O_2$.

To 200 g of the above lithium-containing composite oxide powder, a coating solution having a pH of 3.5 having 3.60 g of a titanium lactate aqueous solution having a Ti content of 8.20% by weight and 0.15 g of lithium carbonate having a lithium content of 18.7% by weight dissolved in 66.25 g of water, was added, followed by drying at 120° C. for 4 hours with mixing and stirring to obtain lithium titanium-impregnated particles. The obtained lithium titanium-impregnated particles were subjected to heat treatment at 700° C. for 12 hours in an oxygen-containing atmosphere, followed by crushing to obtain a powder of a surface modified lithium-containing composite oxide having an average particle size $D_{50}$ of 11.0 μm, $D_{10}$ of 7.1 μm, $D_{90}$ of 17.2 μm and a specific surface area of 0.42 m$^2$/g. The amount of titanium contained in the surface layer of the surface modified lithium-containing composite oxide was 0.3 mol % to the lithium-containing composite oxide as a base material. The alkali amount in the obtained surface modified lithium-containing composite oxide was 0.010% by weight. Further, the press density was 2.55 g/cm$^3$.

An electrode and batteries were produced and evaluated in the same manner as in Example 1 except that a positive electrode sheet was obtained by using the above surface modified lithium-containing composite oxide.

As a result, the initial weight capacity density of the positive electrode between 2.5 and 4.5 V at 25° C. was 173 mAh/g, the initial charge and discharge efficiency was 82.8%, the initial average electric potential during discharge was 3.91 V, the capacity retention after 50 charge and discharge cycles was 95.7%, and the average electric potential during discharge was 3.78 V.

Comparative Example 1

A powder of a lithium-containing composite oxide having a composition of $Li_{1.02}(Co_{0.979}Mg_{0.01}Al_{0.01}Zr_{0.001})_{0.98}O_2$ was prepared in the same manner as in Example 1, and it had an average particle size D50 of 12.0 μm, D10 of 6.8 μm, D90 of 18.1 μm, a specific surface area of 0.28 m$^2$/g obtained by the BET method and an alkali amount of 0.014% by weight.

With respect to the powder of the lithium-containing composite oxide, an X-ray diffraction spectrum was obtained with an X-ray diffraction apparatus (RINT 2100 model, manufactured by Rigaku Corporation), but the existence of lithium titanium compound peaks was not confirmed. In a powder X-ray diffraction using CuKα rays, the half value width of the diffraction peak of (110) plane at 2θ=66.5±1° was 0.114°. The press density of the powder was 3.06 g/cm$^3$.

An electrode and batteries were produced and evaluated in the same manner as in Example 1 except that a positive electrode sheet was obtained by using the above lithium-containing composite oxide.

As a result, the initial weight capacity density of the positive electrode layer between 2.5 and 4.3 V at 25° C. was 155 mAh/g, the initial charge and discharge efficiency was 94.2%, the initial average electric potential during discharge was 3.96 V, the capacity retention after 30 charge and discharge cycles was 98.0%, and the average electric potential during discharge was 3.93 V. The capacity ratio of the case of discharging at a current of 225 mA to the case of discharging at a current of 75 mA per 1 g was 94.1%, and the average electric potential during discharge was 3.87 V.

Further, the initial weight capacity density of the positive electrode layer between 2.5 and 4.5 V at 25° C. was 180 mAh/g, the initial charge and discharge efficiency was 91.4%, the initial average electric potential during discharge was 4.02 V, the capacity retention after 50 charge and discharge cycles was 60.0%, and the average electric potential during discharge was 3.84 V. Further, while the temperature was raised at a rate of 5° C./min by a scanning differential calorimeter, a heat generation starting temperature was measured, and as a result, the heat generation starting temperature of a heat generation curve of the 4.3 V-charged product was 155° C.

Comparative Example 2

To 200 g of a powder of a lithium-containing composite oxide having a composition of $Li_{1.02}(Co_{0.979}Mg_{0.01}Al_{0.01}Zr_{0.001})_{0.98}O_2$ prepared in the same manner as in Example 1, an aqueous solution having a pH of 1.5 having 11.98 g of a titanium lactate aqueous solution having a Ti content of 8.20% by weight dissolved in 58.02 g of water, was added, followed by drying at 120° C. for 4 hours with mixing and stirring. The obtained powder was subjected to heat treatment at 700° C. for 12 hours in an oxygen-containing atmosphere, followed by crushing to obtain a powder of a surface modified lithium-containing composite oxide having an average particle size D50 of 13.7 μm, D10 of 8.3 μm, D90 of 21.4 μm and a specific surface area of 0.28 m$^2$/g obtained by the BET method. The amount of titanium contained in the surface layer of the surface modified lithium-containing composite oxide was 1.0 mol % to the lithium-containing composite oxide as a base material. The alkali amount in the obtained powder of the surface modified lithium-containing composite oxide was 0.007% by weight.

With respect to the powder of the surface modified lithium-containing composite oxide, an X-ray diffraction spectrum was obtained with an X-ray diffraction apparatus (RINT 2100 model, manufactured by Rigaku Corporation). In a powder X-ray diffraction using CuKα rays, the half value width of the diffraction peak of (110) plane at 2θ=66.5±1° was 0.109°. The press density of the powder was 2.95 g/cm$^3$.

An electrode and batteries were produced and evaluated in the same manner as in Example 1 for evaluation except that a positive electrode sheet was obtained by using the above surface modified lithium-containing composite oxide.

As a result, the initial weight capacity density of the positive electrode layer between 2.5 and 4.3 V at 25° C. was 152 mAh/g, the initial charge and discharge efficiency was 94.7%, the initial average electric potential during discharge was 3.95 V, the capacity retention after 30 charge and discharge cycles was 99.1%, and the average electric potential during discharge was 3.96 V. The capacity ratio of the case of discharging at a current of 225 mA to the case of discharging at a current of 75 mA per 1 g was 92.9%, the average electric potential during discharge was 3.84 V.

Further, the initial weight capacity density of the positive electrode layer between 2.5 and 4.5 V at 25° C. was 183 mAh/g, the initial charge and discharge efficiency was 94.1%, the initial average electric potential during discharge was 4.01 V, the capacity retention after 50 charge and discharge cycles was 88.1%, and the average electric potential during discharge was 3.87 V. Further, while the temperature was raised at a rate of 5° C./min by a scanning differential calorimeter, a heat generation starting temperature was measured, and as a result, the heat generation starting temperature of a heat generation curve of the 4.3 V-charged product was 164° C.

Comparative Example 3

To 200 g of a powder of a lithium-containing composite oxide having a composition of $Li_{1.02}$ ($Co_{0.979}Mg_{0.01}Al_{0.01}Zr_{0.001})_{0.98}O_2$ prepared in the same manner as in Example 1, a coating solution having a pH of 3.4 having 11.98 g of a titanium lactate aqueous solution having a Ti content of 8.20% by weight and 0.51 g of lithium carbonate having a lithium content of 18.7% by weight dissolved in 57.51 g of water, was added, followed by drying at 120° C. for 4 hours with mixing and stirring. The obtained powder was fired at 300° C. for 12 hours under an oxygen-containing atmosphere, followed by crushing to obtain a powder of a surface modified lithium-containing composite oxide having an average particle size D50 of 13.6 μm, D10 of 8.4 μm, D90 of 20.7 μm and a specific surface area of 1.54 m²/g obtained by the BET method. The amount of titanium contained in the surface layer of the surface modified lithium-containing composite oxide was 1.0 mol % to the lithium-containing composite oxide as a base material. The alkali amount in the obtained powder of the surface modified lithium-containing composite oxide was 0.055% by weight.

With respect to the powder of the surface modified lithium-containing composite oxide, an X-ray diffraction spectrum was obtained with an X-ray diffraction apparatus (RINT 2100 model, manufactured by Rigaku Corporation). In a powder X-ray diffraction using CuKα rays, the half value width of the diffraction peak of (110) plane at 2θ=66.5±1° was 0.117°. The press density of the powder was 2.85 g/cm³.

An electrode and batteries were produced and evaluated in the same manner as in Example 1 except that a positive electrode sheet was obtained by using the above surface modified lithium-containing composite oxide.

As a result, the initial weight capacity density of the positive electrode layer between 2.5 and 4.3 V at 25° C. was 142 mAh/g, the initial charge and discharge efficiency was 89.6%, the initial average electric potential during discharge was 3.90 V, the capacity retention after 30 charge and discharge cycles was 99.0%, and the average electric potential during discharge was 3.77 V. The capacity ratio of the case of discharging at a current of 225 mA to the case of discharging at a current of 75 mA per 1 g was 89.3%, and the average electric potential during discharge was 3.74 V.

Further, the initial weight capacity density of the positive electrode layer between 2.5 and 4.5 V at 25° C. was 169 mAh/g, the initial charge and discharge efficiency was 88.0%, the initial average electric potential during discharge was 3.94 V, the capacity retention after 50 charge and discharge cycles was 50.0%, and the average electric potential during discharge was 3.34 V. Further, while the temperature was raised at a rate of 5° C./min by a scanning differential calorimeter, a heat generation starting temperature was measured, and as a result, the heat generation starting temperature of a heat generation curve of the 4.3 V-charged product was 165° C.

Comparative Example 4

To 200 g of a powder of a lithium-containing composite oxide having a composition of $Li_{1.02}(Co_{0.979}Mg_{0.01}Al_{0.01}Zr_{0.001})_{0.98}O_2$ prepared in the same manner as in Example 1, a coating solution having a pH of 3.4 having 35.95 g of a titanium lactate aqueous solution having a Ti content of 8.20% by weight and 1.52 g of lithium carbonate having a lithium content of 18.7% by weight dissolved in 32.52 g of water, was added, followed by drying at 120° C. for 4 hours with mixing and stirring. The obtained powder was fired at 500° C. for 12 hours in an oxygen-containing atmosphere, followed by crushing to obtain a powder of a surface modified lithium-containing composite oxide having an average particle size D50 of 17.1 μm, D10 of 9.0 μm, D90 of 29.5 μm and a specific surface area of 0.84 m²/g obtained by the BET method. The amount of titanium contained in the surface layer of the surface modified lithium-containing composite oxide was 3 mol % to the lithium-containing composite oxide as a base material. The alkali amount in the obtained powder of the surface modified lithium-containing composite oxide was 0.040% by weight.

With respect to the powder of the surface modified lithium-containing composite oxide, an X-ray diffraction spectrum was obtained with an X-ray diffraction apparatus (RINT 2100 model, manufactured by Rigaku Corporation), and the existence of $LiTiO_2$ peaks was confirmed. In a powder X-ray diffraction using CuKα rays, the half value width of the diffraction peak of (110) plane at 2θ=66.5±1° was 0.125°. The press density of the powder was 2.81 g/cm³.

An electrode and batteries were produced and evaluated in the same manner as in Example 1 except that a positive electrode sheet was obtained by using the above surface modified lithium-containing composite oxide.

As a result, the initial weight capacity density of the positive electrode layer between 2.5 and 4.3 V at 25° C. was 148 mAh/g, the initial charge and discharge efficiency was 93.2%, the initial average electric potential during discharge was 3.96 V, the capacity retention after 30 charge and discharge cycles was 99.5%, and the average electric potential during discharge was 3.96 V. The capacity ratio of the case of discharging at a current of 225 mA to the case of discharging at a current of 75 mA per 1 g was 92.8%, and the average electric potential during discharge was 3.85 V.

Further, the initial weight capacity density of the positive electrode layer between 2.5 and 4.5 V at 25° C. was 178 mAh/g, the initial charge and discharge efficiency was 92.2%, the initial average electric potential during discharge was 4.02 V, the capacity retention after 50 charge and discharge cycles was 71.4%, and the average electric potential during discharge was 3.79 V. Further, while the temperature was raised at a rate of 5° C./min by a scanning differential calorimeter, a heat generation starting temperature was measured, and as a result, the heat generation starting temperature of a heat generation curve of the 4.3 V-charged product was 168° C.

Comparative Example 5

200 g of a powder of a lithium-containing composite oxide having a composition of $Li_{1.02}(Co_{0.979}Mg_{0.01}Al_{0.01}Zr_{0.001})_{0.98}O_2$ prepared in the same manner as in Example 1 was dispersed in 100 g of water, and 1.76 g of lithium hydroxide having a lithium content of 16.2% by weight was added thereto. Then, 9.75 g of titanium tetrachloride was added thereto to obtain a suspension. This suspension was stirred for 30 minutes, followed by filtration and washing twice with 100 g of water to obtain a slurry. Then, this slurry was dried at 120° C. for 4 hours to obtain lithium titanium-impregnated particles. The obtained powder was fired at 700° C. for 12 hours in an oxygen-containing atmosphere, followed by crushing to obtain a powder of a surface modified lithium-containing composite oxide having an average particle size D50 of 17.6 μm, D10 of 9.4 μm, D90 of 29.0 μm and a specific surface area of 0.49 m²/g obtained by the BET method. The amount of titanium contained in the surface layer of the surface modified lithium-containing composite oxide was 2.5 mol % to the lithium-containing composite oxide as a base material. The alkali amount in the obtained powder of the surface modified lithium-containing composite oxide was 0.028% by weight.

With respect to the powder of the surface modified lithium-containing composite oxide, an X-ray diffraction spectrum was obtained with an X-ray diffraction apparatus (RINT 2100 model, manufactured by Rigaku Corporation). In a powder X-ray diffraction using CuKα rays, the half value width of the diffraction peak of (110) plane at 2θ=66.5±1° was 0.120°. The press density of the powder was 2.84 g/cm³.

An electrode and batteries were produced and evaluated in the same manner as in Example 1 except that a positive electrode sheet was obtained by using the above surface modified lithium-containing composite oxide.

As a result, the initial weight capacity density of the positive electrode layer between 2.5 and 4.3 V at 25° C. was 149 mAh/g, the initial charge and discharge efficiency was 91.1%, the initial average electric potential during discharge was 3.95 V, the capacity retention after 30 charge and discharge cycles was 96.1%, and the average electric potential during discharge was 3.91 V. The capacity ratio of the case of discharging at a current of 225 mA to the case of discharging at a current of 75 mA per 1 g was 91.4%, and the average electric potential during discharge was 3.83 V.

Further, the initial weight capacity density of the positive electrode layer between 2.5 and 4.5 V at 25° C. was 176 mAh/g, the initial charge and discharge efficiency was 90.3%, the initial average electric potential during discharge was 3.94 V, the capacity retention after 50 charge and discharge cycles was 66.9%, and the average electric potential during discharge was 3.73 V. Further, while the temperature was raised at a rate of 5° C./min by a scanning differential calorimeter, a heat generation starting temperature was measured, and as a result, the heat generation starting temperature of a heat generation curve of the 4.3 V-charged product was 165° C.

INDUSTRIAL APPLICABILITY

According to the present invention, it is possible to provide a process for producing a surface modified lithium-containing composite oxide useful as a cathode active material of a positive electrode for a lithium secondary battery, which has large discharge capacity and volume capacity density, high safety, excellent durability for charge and discharge cycles and an excellent rate property, at a low production cost, a positive electrode for a lithium secondary battery containing the produced lithium/titanium composite oxide, and a lithium secondary battery.

The entire disclosure of Japanese Patent Application No. 2007-285507 filed on Nov. 1, 2007 including specification, claims, drawings and summary is incorporated herein by reference in its entirety.

What is claimed is:

1. A process for producing a surface modified lithium-containing composite oxide for a cathode active material for a lithium ion secondary battery, wherein a lithium titanium composite oxide is contained in a surface layer of particles of a lithium-containing composite oxide represented by the formula: $Li_pN_xM_yO_zF_a$, where N is at least one element selected from the group consisting of Co, Mn and Ni, M is at least one element selected from the group consisting of Al, Sn, alkaline earth metal elements and transition metal elements other than Co, Mn and Ni, $0.9 \leq p \leq 1.3$, $0.9 \leq x \leq 2.0$, $0 \leq y \leq 0.1$, $1.9 \leq z \leq 4.2$, and $0 \leq a \leq 0.05$, which comprises impregnating a solution comprising a lithium source and a titanium source dissolved therein into a powder of the lithium-containing composite oxide, and subjecting obtained lithium titanium-impregnated particles to heat treatment at from 400 to 1,000° C., to obtain the surface modified lithium-containing composite oxide, wherein the amount of titanium contained in the surface layer is from 0.01 to 1.95 mol % to the amount of lithium-containing composite oxide used as a base material.

2. The process according to claim 1, wherein the lithium titanium composite oxide is at least one member selected from the group consisting of $Li_2Ti_3O_7$, $Li(Li_{1/3}Ti_{5/3})O_4$, $LiTiO_2$, $Li_2(Li_{1/3}Ti_{5/3})O_4$ and $Li_2TiO_3$.

3. The process according to claim 1, wherein the atomic ratio of lithium to titanium (Li/Ti) contained in the lithium titanium composite oxide is from 1/100 to 5/1.

4. The process according to claim 1, wherein the solution having the lithium source and the titanium source dissolved therein contains a carboxylic acid having at least 2 carboxyl groups, or at least 2 in total of carboxyl groups and hydroxyl groups or carbonyl groups.

5. The process according to claim 1, wherein the solution having the lithium source and the titanium source dissolved therein has a pH of from 1 to 7.

6. The process according to claim 1, wherein the titanium source is titanium lactate.

7. The process according to claim 1, wherein the solution having the lithium source and the titanium source dissolved therein is an aqueous solution.

8. The process according to claim 1, wherein element M contains at least one element selected from the group consisting of Al, Ti, Zr, Hf, Nb, Ta, Mg, Sn and Zn.

9. The process according to claim 1, wherein the lithium source is lithium carbonate.

10. The process according to claim 1, wherein element N is Co.

* * * * *

UNITED STATES PATENT AND TRADEMARK OFFICE
CERTIFICATE OF CORRECTION

| | |
|---|---|
| PATENT NO. | : 8,192,711 B2 |
| APPLICATION NO. | : 12/606224 |
| DATED | : June 5, 2012 |
| INVENTOR(S) | : Uchida et al. |

It is certified that error appears in the above-identified patent and that said Letters Patent is hereby corrected as shown below:

On the Title page, Item [54] and In the Specifications, Column 1, Title:

Delete

"PROCESS FOR PRODUCTION OF CATHODE ACTIVE MATERIAL FOR LITHIUN ION SECONDARY BATTERY"

Insert

--PROCESS FOR PRODUCTION OF CATHODE ACTIVE MATERIAL FOR LITHIUM ION SECONDARY BATTERY--

Page 1 of 1

Signed and Sealed this
Eighteenth Day of March, 2014

Michelle K. Lee
*Deputy Director of the United States Patent and Trademark Office*